March 16, 1937. J. W. JOHNSTON 2,073,696
BLANK MEASURING AND SORTING MACHINE
Filed May 13, 1933 5 Sheets-Sheet 1

Inventor-
James W. Johnston
by Robert [illegible]
Atty.

March 16, 1937.  J. W. JOHNSTON  2,073,696
BLANK MEASURING AND SORTING MACHINE
Filed May 13, 1933   5 Sheets-Sheet 2
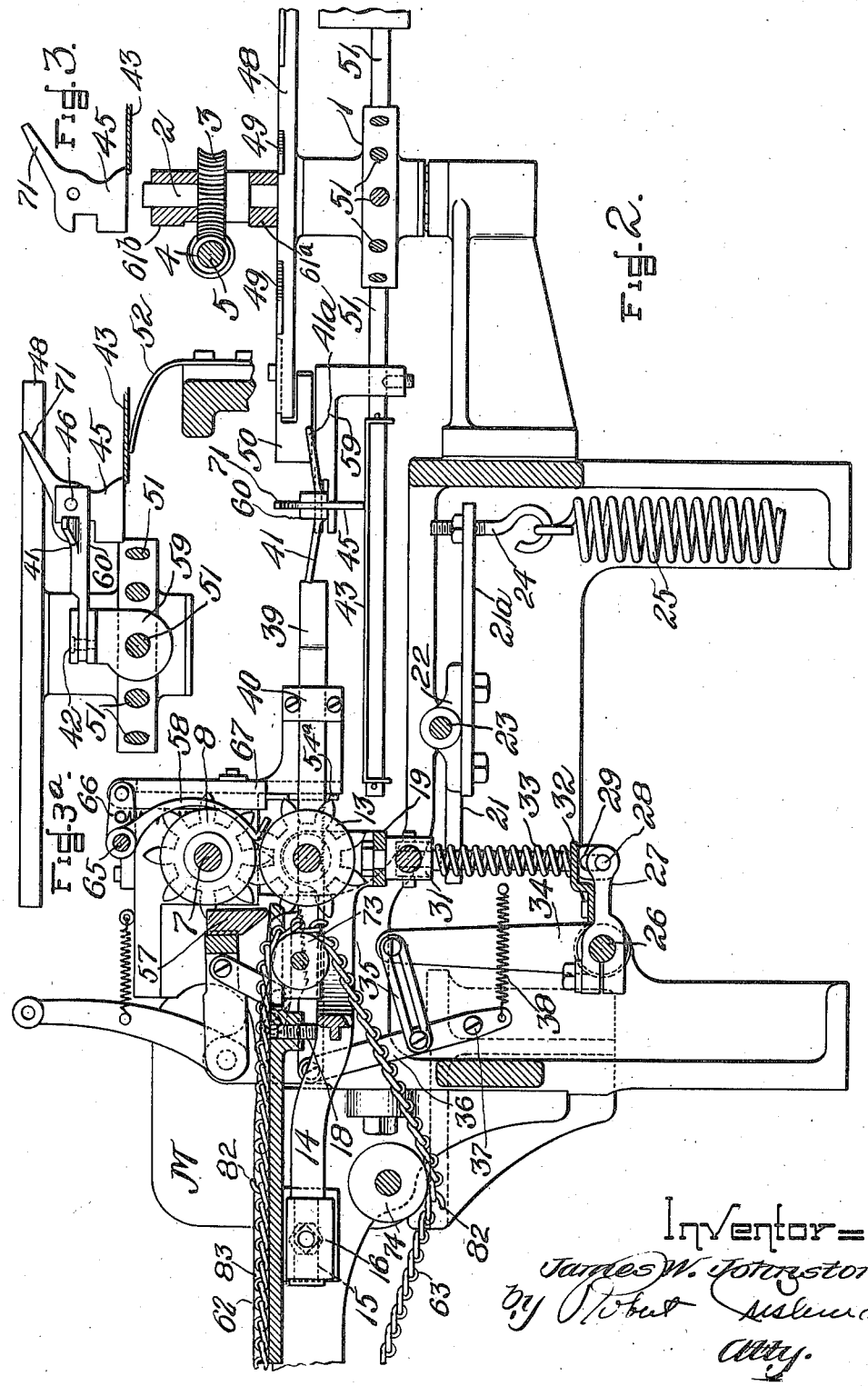

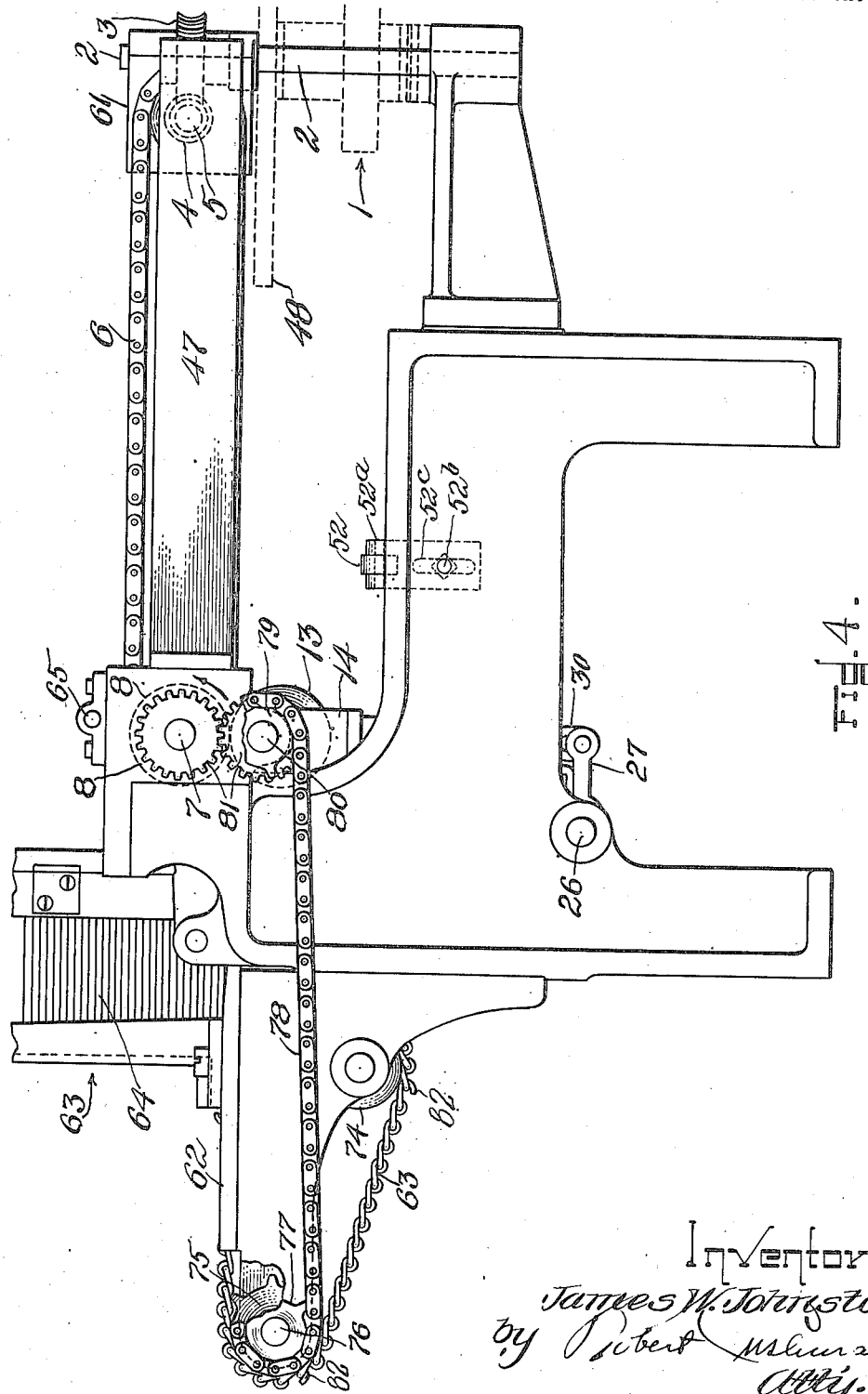

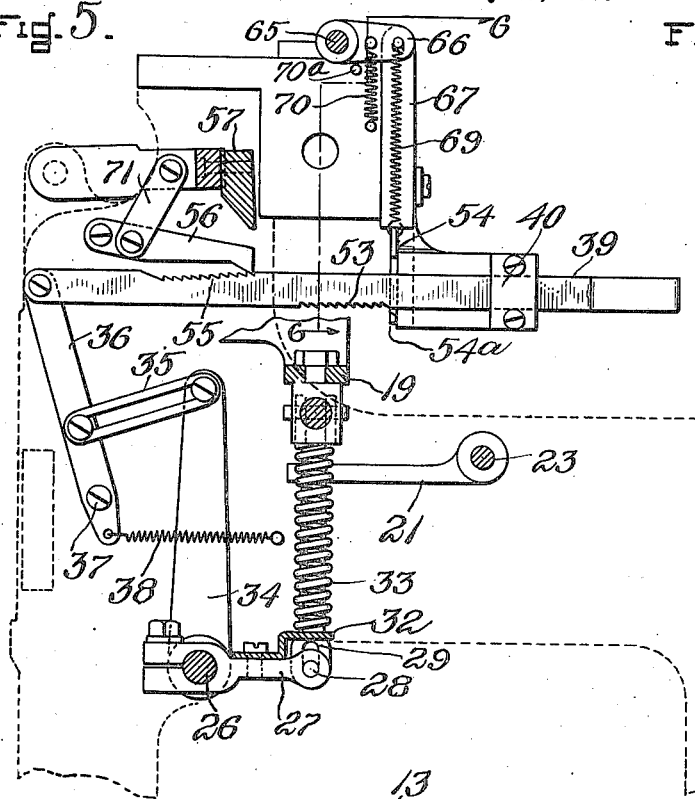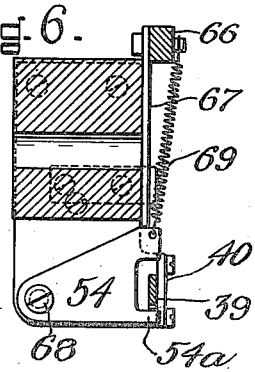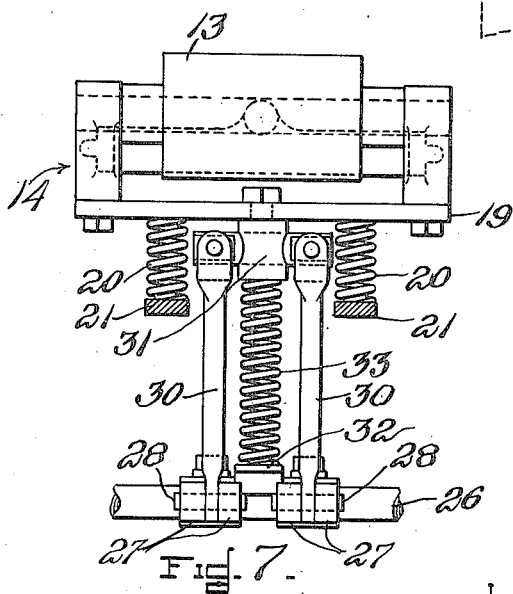

March 16, 1937. J. W. JOHNSTON 2,073,696
BLANK MEASURING AND SORTING MACHINE
Filed May 13, 1933 5 Sheets-Sheet 5
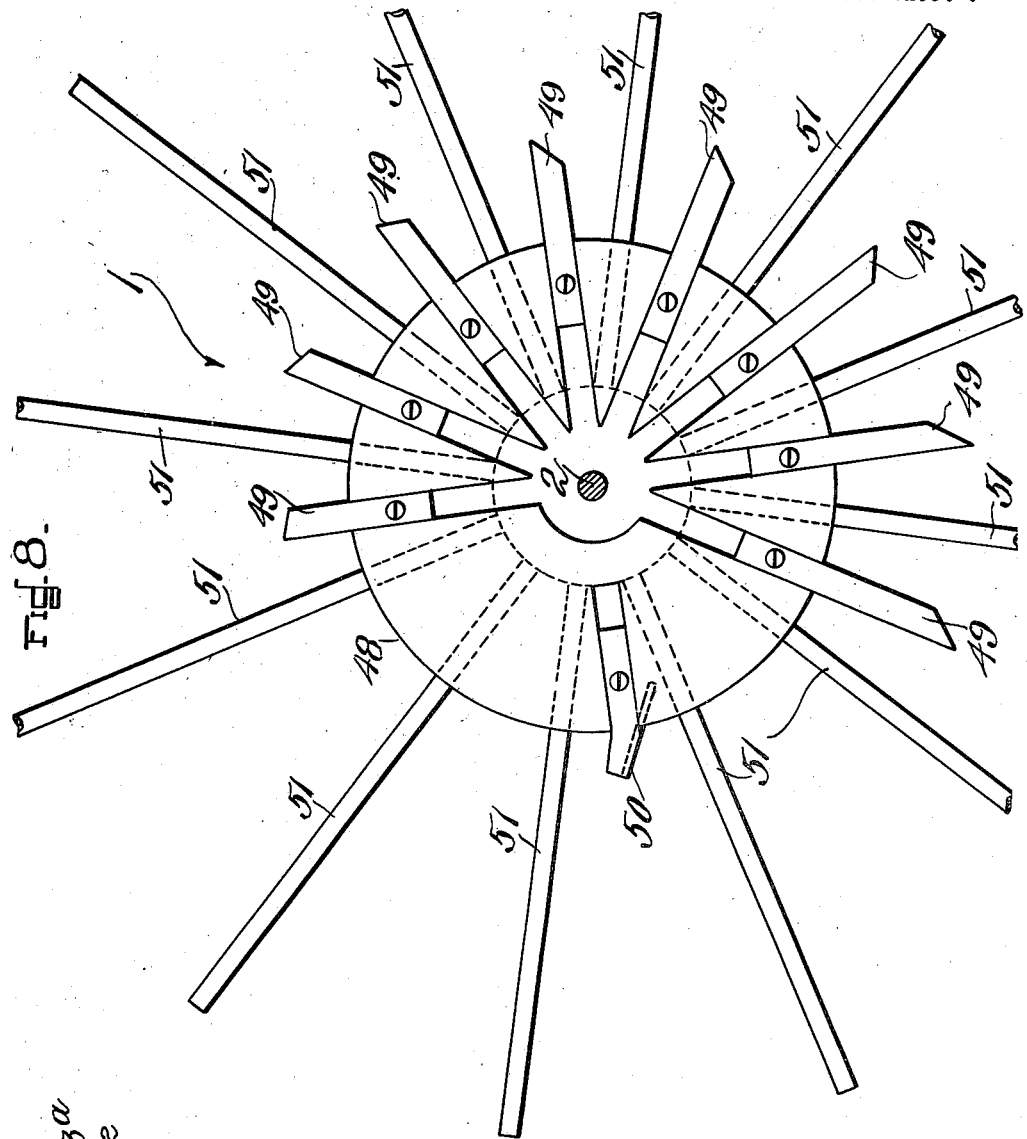
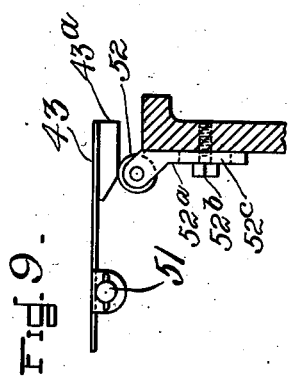
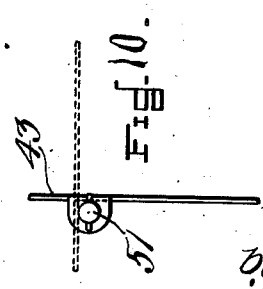
Inventor—
James W. Johnston
by Robert Cushman
Atty.

Patented Mar. 16, 1937

2,073,696

UNITED STATES PATENT OFFICE 2,073,696

BLANK MEASURING AND SORTING MACHINE

James W. Johnston, Manchester, N. H., assignor to North American Holding Corporation, Syracuse, N. Y., a corporation of New York Application May 13, 1933, Serial No. 670,940

8 Claims. (Cl. 209—88)

This invention relates to a machine for measuring and sorting heels, soles, taps and other blanks of the kind used in shoemaking, according to their thickness. The machine is of that type, characteristic of the well-known Nichols machine for grading leather blanks, whether by evening, marking, indicating or sorting, which measures and grades each blank according to the thickness (usually in terms of irons and half irons) of the thinnest part of the blank as determined by the detecting and measuring device.

In the accompanying drawings,—

Fig. 2 is a sectional view on line 2—2 of Fig. 1;

Fig. 3 is a detail of one of the latches hereinafter described;

Fig. 3a is a detail of one of said latches and its adjustable supporting structure.

Fig. 4 is a partial side elevation of the machine;

Fig. 5 is an elevation partly in section of parts of the adjustable setting mechanism;

Fig. 6 is a section on line 6—6 of Fig. 5;

Fig. 7 is a detail of the lower detecting or measuring roll and its associated mechanism viewed from the left of Fig. 2;

Fig. 8 is a plan view of the stationary part of the turntable mechanism hereinafter described; and Figs. 9 and 10 are details illustrating two positions of one of the tilting shelves hereinafter described.

Figure 1:
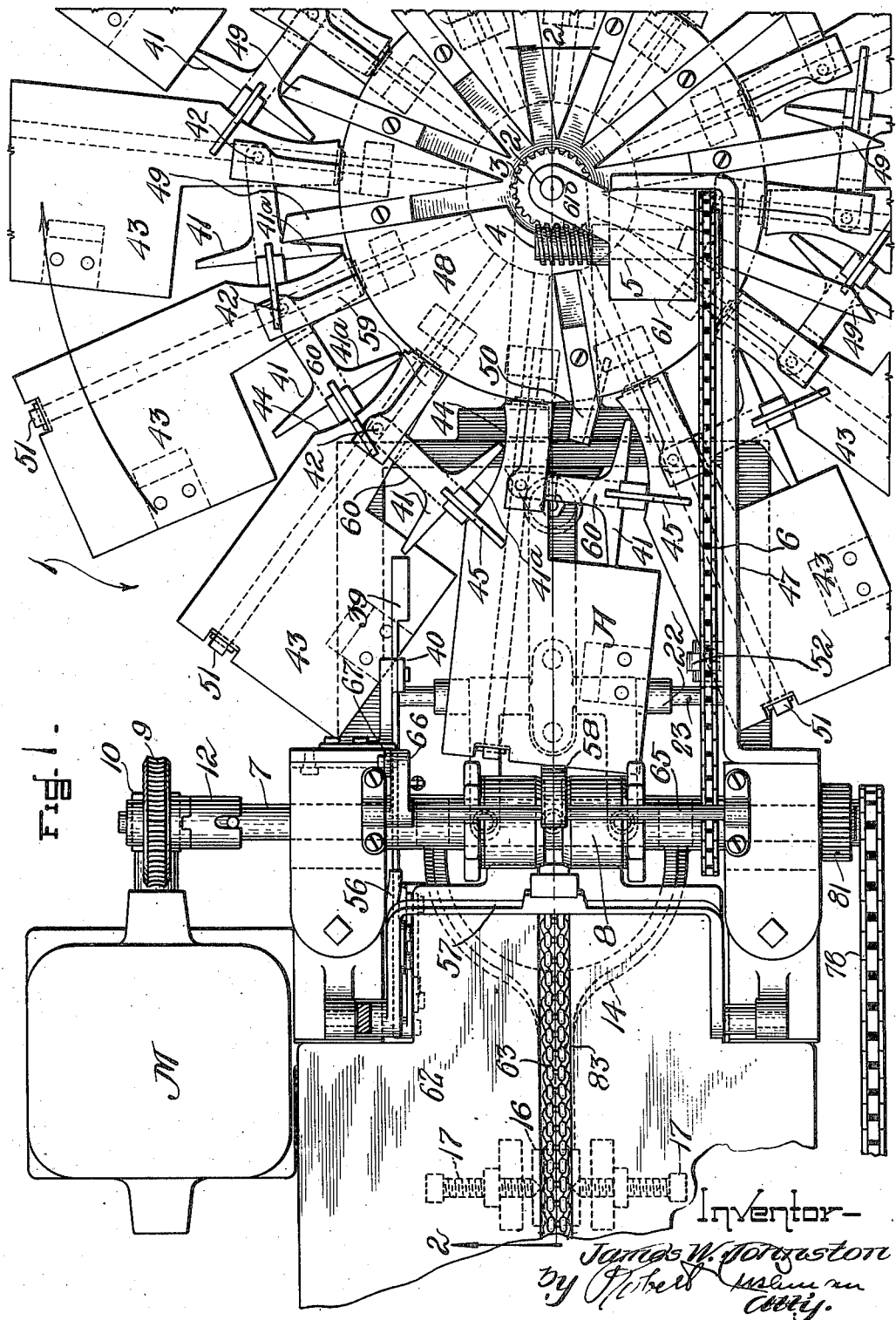
Fig. 1 is a plan view of a machine embodying the invention.

The illustrated embodiment of the invention includes a traveling conveyor in the form of a turntable 1 rigidly mounted on a vertical shaft 2 which is supported to rotate in bearings on the frame of the machine. Shaft 2 carries a worm gear 3 meshing with a driving worm 4 fixed to a short horizontal shaft 5 journaled in a bearing on the machine frame. Shaft 5 is connected by a sprocket chain 6 and suitable sprocket wheels with shaft 7 of an upper measuring roll 8 which is continuously driven in the direction of the arrow on Fig. 4. Shaft 7 is journaled in fixed bearings at opposite sides of the machine frame and extends at one end outside of the frame where it is provided with a worm gear 9 continuously driven by a worm 10 fast on the armature shaft of an electric motor M. A clutch sleeve 12 splined on shaft 7 provides a separable clutch connection between shaft 7 and worm gear 9.

Directly below the upper measuring roll 8 is a lower measuring roll 13 journaled at its ends on the arms of a yoke 14 having a stem whose end is made as a trunnion 15. The trunnion 15 is rotatably mounted in a journal box 16 which is pivotally supported to rock between screws 17 on the machine frame. The axes of said pivot screws are aligned at opposite sides of trunnion 15. The yoke 14 is yieldingly supported against an adjustable stop screw 18 (Fig. 2) by springs as hereinafter described.

Mounted on the frame of the machine at its intake end is a fixed table 62 which forms the bottom or floor of a magazine or hopper 63 (Fig. 4) holding a stack of blanks 64, such as heel lifts of different thicknesses, which are to be measured and sorted. For clearness of illustration the hopper is omitted from Figs. 1 and 2. In operation the blanks 64 are fed forward one at a time into the nip of the measuring rolls 8 and 13 by which they are measured and delivered to the distributor.

As each blank passes between the measuring rolls 8 and 13 the lower roll 13 moves up and down in response to variations in thickness of the passing blank. These detecting or measuring motions of the lower roll 13 are transmitted to the latch-setting or controlling member 39 so as to position the member 39 relatively to the turntable according to the measurement of the thinnest part of the blank as detected by the detecting and measuring rolls. The member 39 constitutes the controller for governing the distribution of the blanks according to their measurements.

The effective measuring action begins when the forward end of the blank engages and swings aside the trip arm 58 and ends when the gate 57 drops off from the rear end of the passing blank. At the end of the measuring action the latch-setting member 39, which has been adjusted endwise in response to the measuring rolls, occupies a definite position which accords with or registers the thickness of the thinnest spot of the blank encountered by the measuring rolls. Successive increments of thinness detected by the measuring rolls cause the latch-setting member 39 to shift to the left, away from the turntable. The position of member 39 controls the action of the distributor so as to cause the blanks to be delivered at different stations in accordance with their thinness measurements as determined by the detecting rolls.

The starting trip 58 is fixed to a transverse rock shaft 65 journaled in bearings on the frame of the machine. Near one end of rock shaft 65 is fixed another arm 66 to which is pivoted the upper end of a pendant link 67, whose lower end abuts against a detent 54. The detent 54 is pivoted at 68 (Fig. 6) to the frame of the machine and is yieldingly urged upward against the end of link 67 by a spring 69, one end of which is connected with the detent member and the other end with arm 66. The detent member 54 is made with a tooth or pawl 54ª which cooperates with a rack of ratchet teeth 53 on the under side of the latch-setting bar 39. Normally a spring 70 acts through arm 66 and link 67 to hold the pawl 54ª down out of engagement with rack 53, one end of said spring 70 being attached to the arm 66 and the other end to the frame of the machine. A stop 70ª limits the downward movement of arm 66 under the influence of spring 70.

On the top side of the latch-setting bar 39 is a rack of ratchet teeth 55 to cooperate with a detent or pawl 56, which is pivoted to the frame of the machine and connected by a link 71 to the usual gate 57. The teeth of racks 55 and 53 face in opposite directions. When there is no blank under gate 57 the gate occupies its lowermost position resting on table 62 with the pawl 56 in engagement with rack 55.

Fixed to under side of the arm of the yoke 14, which carries the lower measuring roll 13, is a crossbar 19 (Figs. 2, 5, and 7). Bearing against the under side of crossbar 19 are a pair of springs 20, which are seated on a pair of arms 21 forming part of a lever 22, fulcrumed on a cross rod 23 journaled at opposite ends in bearings on the machine frame. The rearwardly extending arm 21ª of lever 22 is provided with an adjustable hook 24 connected to the upper end of a relatively strong, stiff spring 25, whose lower end is fastened to the machine frame. The springs 25 and 20 serve yieldingly to support the yoke 14 against the stop screw 18 with the lower measuring roll 13 close to the upper roll 8.

Below the lower roll 13 is a rock shaft 26 to which is fixed a pair of arms 27 provided at their ends with pins 28 which occupy slots 29 in the lower ends of a pair of links 30. The upper ends of the links 30 are pivotally connected to a bracket 31 fast to the under side of cross bar 19. Fastened to the two arms 27 is a bracket 32 on which rests the lower end of a spring 33 whose upper end bears against the bracket 31 on crossbar 19. The spring 33 tends yieldingly to hold each pin 28 at the bottom of its slot 29. Consequently, during the measuring operation, downward movements of the lower detecting roll 13 in response to successively thicker spots of the blank encountered by the detecting rolls may take place, without affecting the arm 27, by reason of the loose pin and slot connections 28, 29, whereas upward movement of the detecting roll 13, in response to successively thinner parts of the blank being measured, will swing the arms 27 upwardly. Obviously flexible chains or cables might be substituted for the links 30 if desired.

It will be seen that the supporting structure for the lower detecting roll 13 comprising the springs 20 and 25 and the yoke 14, swiveled to rock on trunnion 15, permits the roll 13 to tilt somewhat with relation to the upper roll 8 and so accommodate itself to a transversely uneven blank. It will also be clear that the pin and slot connections 28, 29, will cause that one of the two links 30, which occupies the higher position of the two links, to determine the position of the arms 27 which are held down by spring 33 to the limit permitted by one or the other of slots 29, whichever stands in the higher position.

Fixed to shaft 26 is an arm 34 connected by a slotted link 35 with a lever 36 fulcrumed at 37 on the frame of the machine. A spring 38 yieldingly holds the upper arm of lever 36 at the limit of its swing toward the left as determined by the end of the slot in link 35. The upper arm of lever 36 is pivotally connected with one end of the adjustable latch-setting member 39 which slides in a guideway 40 mounted on the machine frame.

The position of the rear or right-hand end of the ratchet member 39 controls the distribution of the blanks according to their measurements. This is accomplished by adjusting the position of a series of latches carried by the turntable, each latch as it passes the end of the control member 39 being shifted in position according to the position of member 39. Associated with each latch is an individual blank carrier moving with the turntable and each latch, depending upon its position of adjustment by the control member 39, causes the blank to be discharged from its carrier at the station corresponding to the measured grade of the blank. Fixed to the several radial arms 51 of the turntable 1 are a circular series of brackets 59 upon each of which a latch support 60 is mounted to swing in a horizontal plane on pivot 42. A latch 45 is pivoted to the free end of each latch support 60. Each latch and latch support is associated with a tilting shelf 43, constituting the individual blank carrier, the several shelves 43 being similarly mounted in a circular series, each being hinged to one of the radial arms 51 of the turntable. Each shelf is formed with a concave arcuate edge 44 concentric with the pivot 42 of the latch support 60 carrying the latch 45 which cooperates with the arcuate margin 44.

A stationary circular plate 48 is disposed immediately above the hub of the turntable 1 and is fixed to the lower arm 61ª of a box 61, in which the driving shaft 5 of the turntable is journaled. The box 61 is also made with an upper arm 61ᵇ, the two arms 61ª and 61ᵇ constituting a bearing for shaft 2. The box 61 is fixed to a bracket 47 which forms a part of the frame of the machine. On this stationary plate 48 is fixed a series of latch tripping abutment arms 49 of graduated length to cooperate with the upwardly extending fingers 71 of the latches 45.

The plate 48 also carries a stationary cam 50 (Figs. 1 and 2) for resetting the latch supports 60 as they approach the end of the controlling member 39 during the travel of the turntable.

Each latch support 60 is made with two opposite laterally extending arms 41 and 41ª, the former cooperating with the control member 39 and the latter with the resetting cam 50.

The blanks to be measured and sorted are preferably fed forward automatically one at a time from hopper 63 to the measuring rolls 8 and 13 in timed relation to the movement of the shelves or carriers 43 past the receiving station A, by a continuously driven endless feed chain 63. The feed chain 63 extends around two guide rolls 73 and 74 and a driving sprocket 75 fast on a transverse shaft 76 journaled in bearings on the frame of the machine. Shaft 76 carries a sprocket 77 connected by a chain 78 (Figs. 1 and 4) with a sprocket 79 fast on a short spindle 80 journaled in a stationary bearing on the machine frame. Shaft 80 is connected by gearing 81 with the continuously driven shaft 7 of the upper measuring roll 8. The feed chain 63 is driven at the same speed as the surfaces of rolls 8 and 13. At intervals along its length the chain 63 is provided with hooks or projections 82, by which the lowermost blank of the stack 64 in the hopper 63 is fed forward to the measuring rolls 8 and 13 in timed relation with the passage of the shelves 43 at the loading station A, so that when a blank is discharged from between the measuring rolls it will fall by gravity directly on one of the shelves 43. The chain 63 is supported by its guide rolls and sprocket so that a straight horizontal stretch of the feed chain rests upon the top of the shelf or table 62 within a guiding groove 83 formed in the top of the table.

The operation of the machine is as follows: As each blank is fed forward from the bottom of the stack 64 by the feed chain 63 it first engages the beveled underface of the gate 57, thereby lifting the gate, which is thereafter supported on top of the blank, during its passage under the gate. The lifting of gate 57 disengages the pawl or detent 56 from the ratchet 55 on the controller member 39. The blank next enters between the measuring rolls 8 and 13. The lower roll 13 is thereby pressed downwardly and acts through the connections described to shift the control member 39 to the right a distance corresponding to the thickness of the entering end of the blank. Immediately after entering the nip of the measuring rolls 8 and 13 the forward end of the blank engages and operates the starting trip 58, thereby engaging the pawl or detent 54ª with the ratchet 53. Consequently, as the measuring progresses the control member 39 is locked against further movement to the right in response to any thicker areas in the blank which may be encountered by the measuring rolls, but is free to be moved to the left in response to successively thinner spots detected by the measuring rolls, each increment of thinness being preserved or registered by the ratchet and pawl 53 and 54ª. When the rear or trailing end of the blank passes out from under gate 57 the gate drops to the table and reengages pawl 56 with ratchet 55. The control member 39 is now locked against movement in either direction and is in the position corresponding to the measurement of the thinnest spot of the blank as found by the detecting or measuring rolls. When the blank is discharged from the measuring rolls it falls by gravity on one of the shelves 43 of the distributor at the loading station A, the travel of the distributor conveyor or turntable being so timed with relation to the action of the feed chain and measuring rolls, that one of the shelves 43 is opposite the measuring rolls each time a blank is discharged from the rolls. As each shelf moves away from the loading station A, after receiving a blank from the measuring rolls, the support 60 carrying the latch 45 which later causes the blank carrier or shelf 43 to deliver the blank at the appropriate station passes the end of control member 39 and is angularly adjusted toward the axis of the turntable by the engagement of its arm 41 with the end of member 39. The position of adjustment of the latch accords with the position of the controlling member 39, which in turn accords with the grade measurement of the blank just deposited on the shelf 43. At this time the shelf 43 is held in horizontal position by the engagement of the nose of its latch 45 with the top side of the shelf. As each latch support 60 is thus angularly adjusted on its pivot 42 by member 39 its latch 45 slides sidewise along the margin adjacent the arcuate edge of the shelf 44. Each shelf 43 is pivoted substantially to one side of its center on a spoke 51 of the turntable so that when released from its latch 45, which engages the shorter side of the shelf measured from its pivotal axis, it tends to tilt by gravity and dump its load. As the shelf 43, thus held by latch 45 in horizontal blank-receiving and transporting position, travels around with the turntable or conveyor the finger 71 of its latch 45 engages and passes the shelf-operating abutment arm 49, which is fixed in the position corresponding with the particular setting of the latch and latch support of that shelf as determined by the control member 39. Thereupon the latch 45 is swung out of engagement with the edge of the shelf by the camming action of the finger 71 against the operating arm 49, and the weight of the shelf and its blank causes the shelf to swing or tilt downwardly and drop the blank edgewise at that point in its travel around the axis of the turntable. There is an important advantage in thus dropping the blanks edgewise in a plane which is approximately vertical and which is also radial with respect to the axis of the turntable. It permits the use of narrower receiving bins than would be possible if the blanks were dropped flatwise, without danger of the blanks striking the side walls of the bins and possibly being misdistributed. It also permits arranging the receiving stations in a more compact space with the bins closer together. Bins of the type shown in the Cogswell Patent No. 1,693,638, dated December 4, 1928 may be advantageously used. These are in the form of narrow segments of a circle arranged side by side in a row with their flat sides disposed radially, forming a part of a circle concentric with shaft 2. The end of each bin nearest the center is much narrower than the opposite end and may even be less in width than the blanks, so that if the blanks were dropped flatwise instead of edgewise they would strike the side walls of the bins. Such interference is avoided by dropping them edgewise as herein described. After each individual carrier or shelf drops its load it hangs downwardly as shown in Fig. 10, but as it again approaches its loading position A during the rotation of the turntable in the direction of the arrow (Fig. 1) it drags over a roller 52 on the frame of the machine which raises it to horizontal position as shown in Fig. 9, where it is caught and held by the latch 45. Also, as each shelf approaches the loading station A for receiving another blank from the measuring rolls, the latch support 60, which still occupies the position of its next previous adjustment, is restored to its original position away from the axis of the turntable by the engagement of its arm 41ª with the resetting cam 50.

The shelf resetting roller 52, Figs. 1, 4, and 9, is journaled on a bracket 52ª secured to the frame of the machine by means of a screw 52ᵇ. This screw occupies a slot 52ᶜ formed in bracket 52ª so that the latter can be adjusted vertically as required to set the roller in its proper operative position with respect to the path of the shelves. To the bottom of the heavier side of each shelf 43 is secured a cam-like block 43ª which constitutes a shoe to cooperate with the roller 52, and which also serves as an operating weight for the shelf when the latch 45 of the latter is tripped to deliver its load at one of the distributing stations.

I claim:

1. A blank sorting machine comprising means for measuring successive blanks according to thickness, distributor mechanism including a traveling conveyor and individual carriers moving with the conveyor, by which the blanks are successively received and carried after being measured, the measuring means being adjacent to the path of the carriers and adapted to deliver the blanks directly from the measuring means upon the carriers, and mechanism responsive to the measuring means for causing the blanks to be discharged from the carriers at different stations according to their measurements, said means comprising a latch associated with each carrier, each latch having an adjustable abutment member, means responsive to the operation of said measuring means for positioning the adjustable abutment members in a position corresponding to the measured thickness of the blanks, and graduated trip members arranged to engage the abutment members during movement of the conveyor and effect the release of the latches.

2. A blank sorting machine comprising measuring rolls for measuring successive blanks according to thickness, distributor mechanism including a traveling conveyor and individual carriers moving with the conveyor, by which the blanks are successively received and carried after being measured, the measuring rolls being adjacent to the path of the carriers and adapted to deliver the blanks directly from the measuring rolls upon the carriers, means for driving the measuring rolls and the conveyor continuously and at predetermined relative speeds, and mechanism responsive to the measuring rolls for causing the blanks to be discharged from the carriers at different stations according to their measurements, said means comprising a latch having an adjustable abutment member, means responsive to the operation of said measuring rolls for positioning the adjustable abutment members to correspond with the measured thickness of the blanks, and graduated trip members arranged to engage the abutment members during the movement of said conveyor and effect the release of the latches.

3. A blank sorting machine comprising measuring rolls for measuring successive blanks according to thickness, distributor mechanism including a traveling conveyor and individual carriers moving with the conveyor, by which the blanks are successively received and carried after being measured, the measuring rolls being adjacent to the path of the carriers and adapted to deliver the blanks directly from the measuring rolls upon the carriers, means for driving the measuring rolls and the conveyor continuously and at predetermined relative speeds, means to feed the blanks one by one to the measuring rolls in timed relation to the travel of the carriers past the feed rolls whereby each blank will be delivered by the feed rolls upon one of the continuously moving carriers, and mechanism responsive to the measuring rolls for causing the blanks to be discharged from the carriers at different stations according to their measurements, said means comprising a latch having an adjustable abutment member, means responsive to the operation of said measuring rolls for positioning the adjustable abutment members to correspond with the measured thickness of the blanks, and graduated trip members arranged to engage the abutment members during the movement of said conveyor and effect the release of the latches.

4. A blank sorting machine comprising measuring rolls for measuring successive blanks according to thickness, distributor mechanism including a turntable having radial arms and individual tilting carrier shelves arranged concentrically about the axis of the turn-table and pivotally supported on said radial arms, the measuring rolls being adjacent to the path of the carrier shelves and adapted to deliver the blanks directly from the measuring rolls upon the carrier shelves, and mechanism responsive to the measuring rolls for causing the carrier shelves to be tilted and the blanks to be discharged at different stations according to their measurements, said means comprising a latch having an adjustable abutment member, means responsive to the operation of said measuring rolls for positioning the adjustable abutment members to correspond with the measured thickness of the blanks, and graduated trip members arranged to engage the abutment members during the movement of said conveyor and effect the release of the latches.

5. A blank sorting machine comprising a distributing mechanism including a continuously moving conveyor having individual carriers, a pair of cooperating measuring rolls rotatable in timed relation to the movements of said conveyor and operative to measure the thickness of successive blanks and feed them directly onto said carriers, a latch associated with each carrier and operative to hold it in position to retain a blank delivered thereto, each latch having an adustable abutment member, latch setting mechanism responsive to said measuring rolls and engageable with the abutment members to set them in positions corresponding to the measured thicknesses of the blanks delivered to the carriers, and a plurality of stationary trips disposed along the path of travel of said carriers and operative to engage said abutment members to effect the release of the latches so as to discharge the blanks at stations corresponding to their measured thicknesses.

6. A blank sorting machine comprising measuring rolls for measuring successive blanks according to thickness, distributor mechanism including a table having radial arms and individual tilting carrier shelves arranged concentrically about the axis of the turn-table and pivotally secured upon said radial arms, adjustable latches normally holding each shelf in blank supporting position and pivotally mounted to swing horizontally on the next adjacent radial arm, each shelf being provided with an arcuate marginal area adapted to cooperate with its associated latch in all positions of horizontal adjustment of the latch, and mechanism responsive to the measuring rolls for adjusting the latches to cause the carrier shelves to be tilted and the blanks to be discharged at different stations according to their measurements.

7. A sorting machine comprising a continuously moving conveyor having individual carriers mounted to tip from a blank supporting position to a tilted position, means for measuring the thickness of successive blanks and delivering them directly to said carriers, an adjustable latch associated with each carrier and operative to lock it in blank supporting position, means operative to tip each carrier from tilted position to blank supporting position and for throwing its associated latch into locking position as the carrier moves into a position to receive a measured blank, latch setting mechanism responsive to said measuring means for adjusting the position of each latch to correspond with the measured thickness of the blank delivered to its associated carrier, and trip members disposed along the path of travel of said carriers and operative to release said latches so as to discharge said blanks at stations corresponding to their measured thicknesses.

8. A sorting machine comprising a turntable having a plurality of radially extending arms, individual carriers mounted on said arms to swing from a blank supporting position to tilted position, measuring rolls adapted to gauge the thickness of successive blanks and deliver them directly to the carriers, an adjustable latch associated with each carrier and adapted to lock it in blank supporting position, means operative to swing each carrier from tilted position to blank supporting position and throw its associated latch into locking position as the carrier moves into position to receive a measured blank, latch setting mechanism responsive to said measuring rolls for adjusting the position of each latch to correspond with the measured thickness of the blank delivered to its associated carrier, and a plurality of graduated trip members disposed along the path of travel of said carriers and operative to release said latches so as to discharge said blanks at stations corresponding to their measured thicknesses.

JAMES W. JOHNSTON.